UNITED STATES PATENT OFFICE.

WILLIAM G. LINDSAY, OF NEW YORK, N. Y., ASSIGNOR TO THE CELLULOID COMPANY, OF NEW YORK, N. Y., A CORPORATION OF NEW JERSEY.

SOLVENT FOR ACETYL CELLULOSE.

1,041,112. Specification of Letters Patent. Patented Oct. 15, 1912.

No Drawing. Application filed August 25, 1911. Serial No. 646,067.

*To all whom it may concern:*

Be it known that I, WILLIAM G. LINDSAY, a citizen of the United States, residing in the city of New York, State of New York, have invented certain new and useful Improvements in Solvents for Acetyl Cellulose, of which the following is a specification.

The various compositions to which the present invention relates are employed in the arts, namely, as imitations of natural substances and in films used for photographic and therapeutic purposes, and consist of soluble acetyl cellulose combined with or dissolved in certain other substances or menstrua. Although the final or useful form of the different compounds of this class is that of a solid or dried material, the different processes of conversion into this final solid form involve, as is well understood, the employment of solutions of mixtures of varying consistency as to plasticity, stiffness or fluidity dependent generally upon the proportion and kind of solvent used to the amount of the soluble acetyl cellulose.

There are two classes of solvents; liquids which are solvents in themselves, such as epichlorhydrin, dichlorhydrin, acetone, etc., and solvents which are formed by combining two or more substances with each other. The components of the mixed solvent in such a case may not necessarily be possessed of individual solvent power; for instance, in the case of nitrocellulose ethyl alcohol, which is practically a non-solvent in itself forms a good solvent mixture when camphor is dissolved in it. The various applications of this art require the employment of complex mixtures in the solvent—single substances being rarely used for such purpose. Hence, while the advancement of the art has depended largely on the discovery and application of new single solvents yet it has also required the invention of combinations of solvents by which effects are produced quite different from those produced when single solvents are employed alone.

The action of some solvents or diluents is quite distinct from that of others in that they require a shorter or longer time for seasoning of the material and the evaporation of the more volatile solvents is restrained by that of the less volatile ingredients so that the resulting solid is homogeneous, without air bubbles, without marks, and is pellucid or even transparent and translucent.

It is well known that there are some varieties of acetyl cellulose which are soluble in acetone, but the films produced by a solution of acetyl cellulose in acetone often are not films or solid bodies having all the properties desired.

I have discovered that pentachlorethane when mixed with an equal volume of methyl alcohol produces a solvent for acetyl cellulose having very valuable properties which can be made use of in the production of plastic masses, sheets and films.

It has been suggested that pentachlorethane in combination with ethyl alcohol produces a swelling of acetyl cellulose, but the object of my invention was to produce a clear and fluid solution and I have found that it can only be obtained, so far as I have discovered, through the use of certain definite and limited proportions of methyl alcohol with the pentachlorethane.

As an example of carrying out my invention I proceed as follows: I dissolve acetyl cellulose in a mixture of equal parts of pentachlorethane and methyl alcohol (by volume) and employ a sufficient quantity of this liquid solvent to produce the fluidity desired. The solution thus produced can, upon the evaporation of the liquid solvent, be used for the manufacture of solid objects or films, according to the processes which are well known and which are applicable for such purposes.

I do not limit myself to exactly the equal proportions of pentachlorethane and methyl alcohol named, for there may be slight variations on either side of the line, but I have found equal volumes to be very efficient.

Having thus described my invention, what I claim is:

1. A new composition of matter consisting of acetyl cellulose dissolved in a mixture of pentachlorethane and methyl alcohol, said solvent ingredients being in substantially equal volumes, substantially as described.

2. A new composition of matter consisting of acetyl cellulose dissolved in a mixture of pentachlorethane and methyl alcohol (said solvent ingredients being in substantially equal volumes) in conjunction with other solvents, liquid or solid, substantially as described.

3. A new composition of matter consisting of acetyl cellulose dissolved in a mixture of pentachlorethane and methyl alcohol (said solvent ingredients being in substantially equal volumes) in conjunction with other solvents, liquid or solid, and inert materials, substantially as described.

WILLIAM G. LINDSAY.

Witnesses:
 MABEL DENTON,
 J. E. HINDON HYDE.